US008832734B2

(12) United States Patent
Scott et al.

(10) Patent No.: US 8,832,734 B2
(45) Date of Patent: Sep. 9, 2014

(54) APPARATUS AND METHOD FOR PROVIDING DISTRIBUTED MEDIA CONSUMPTION

(75) Inventors: Charles Scott, Austin, TX (US); Ankur Mukerji, Austin, TX (US); Scott White, Austin, TX (US)

(73) Assignee: AT&T Intellectual Property I, LP, Atlanta, GA (US)

( * ) Notice: Subject to any disclaimer, the term of this patent is extended or adjusted under 35 U.S.C. 154(b) by 281 days.

(21) Appl. No.: 12/620,239

(22) Filed: Nov. 17, 2009

(65) Prior Publication Data

US 2011/0119706 A1    May 19, 2011

(51) Int. Cl.
*H04N 7/10*       (2006.01)
*H04N 21/4788*    (2011.01)

(52) U.S. Cl.
CPC .................................. *H04N 21/4788* (2013.01)
USPC ................ 725/34; 725/37; 725/105; 715/758

(58) Field of Classification Search
CPC .................................................. H04N 21/4788
USPC ..................................................... 725/34, 37
See application file for complete search history.

(56) References Cited

U.S. PATENT DOCUMENTS

| | | | | |
|---|---|---|---|---|
| 2002/0144273 A1* | 10/2002 | Reto | ................................ | 725/86 |
| 2003/0229900 A1* | 12/2003 | Reisman | .......................... | 725/87 |
| 2005/0034079 A1* | 2/2005 | Gunasekar et al. | ........... | 715/753 |
| 2007/0283403 A1* | 12/2007 | Eklund et al. | .................. | 725/117 |
| 2008/0168506 A1* | 7/2008 | Pickelsimer | .................... | 725/61 |
| 2008/0172412 A1* | 7/2008 | Gruhl et al. | ................. | 707/104.1 |
| 2010/0037266 A1* | 2/2010 | Rahman | ........................... | 725/56 |
| 2010/0037277 A1* | 2/2010 | Flynn-Ripley et al. | ........ | 725/110 |
| 2010/0199310 A1* | 8/2010 | Newell | ............................ | 725/46 |

OTHER PUBLICATIONS www.chrisharrison.net/projects/collaboratv/index.html.

* cited by examiner

*Primary Examiner* — Robert Hance
(74) *Attorney, Agent, or Firm* — Guntin & Gust, PLC; Jay H. Anderson

(57) ABSTRACT

A system that incorporates teachings of the present disclosure may include, for example, a first set-top-box (STB) of a group of STBs, the first STB having a controller to select via a graphical user interface (GUI) a media program and a second STB of the group of STBs for receiving an invitation to participate in a media session, wherein the media session comprises presentation of the media program, transmit the invitation to the second STB of the group of STBs, wherein information associated with the invitation is visually displayed at a third STB of the group of STBs participating in the media session, and present the media program at the first STB during the media session, wherein the media program is presented at the third STB during the media session. Other embodiments are disclosed.

18 Claims, 7 Drawing Sheets

600

APPARATUS AND METHOD FOR PROVIDING DISTRIBUTED MEDIA CONSUMPTION

FIELD OF THE DISCLOSURE

The present disclosure relates generally to media consumption and more specifically to an apparatus and method for providing distributed media consumption.

BACKGROUND

In today's society, users are able to enjoy and experience media content through standard televisions, set-top-boxes (STBs), personal computers, mobile communications devices, personal digital assistants (PDAs), and through other devices. The media content can often include audio content, video content, text content, still image content, and/or combinations thereof. Users can receive the various types of media content via Internet Protocol Television (IPTV), cable TV, satellite TV, and through other means.

Users often choose to experience media content on their own, however, often times users would prefer to experience the media content with others. Typically, users have to call their friends to plan a get-together to enjoy a particular media program, however, such a method often results in friends arriving late or not being able to make it. Encouraging users to consume the same media content at the same time can provide for a more interesting and enriching media experience.

DETAILED DESCRIPTION

One embodiment of the present disclosure can entail a method, including receiving an invitation from a media processor to participate in a media session, wherein the media session comprises presentation of a media program selected by the media processor, and wherein the media processor operates in an interactive television (iTV) network, displaying the invitation received from the media processor and information associated with the invitation, transmitting to the media processor a response to the invitation via a graphical user interface (GUI), wherein the response comprises one of an acceptance and a rejection of the invitation, participating in the media session if the response comprises the acceptance of the invitation, and presenting the media program at a scheduled viewing time while participating in the media session.

Another embodiment of the present disclosure can entail a first set-top-box (STB) of a group of STBs, the first STB having a controller to select via a GUI a media program and a second STB of the group of STBs for receiving an invitation to participate in a media session, wherein the media session comprises presentation of the media program, transmit the invitation to the second STB of the group of STBs, wherein information associated with the invitation is visually displayed at a third STB of the group of STBs participating in the media session, and present the media program at the first STB during the media session, wherein the media program is presented at the third STB during the media session.

Yet another embodiment of the present disclosure can entail a computer-readable storage medium having computer instructions to select a media program and a first media processor of a plurality of media processors for receiving an invitation to participate in a media session, wherein the media session comprises presentation of the media program, transmit the invitation to the first media processor, wherein information associated with the invitation is visually displayed at the first media processor and a second media processor of the plurality of media processors participating in the media session, receive a response to the invitation from the first media processor, wherein the response comprises one of an acceptance and a rejection of the invitation, and present the media program at the first media processor during the media session if the acceptance was received, wherein the media program is presented at the second media processor during the media session.

Figure 1:
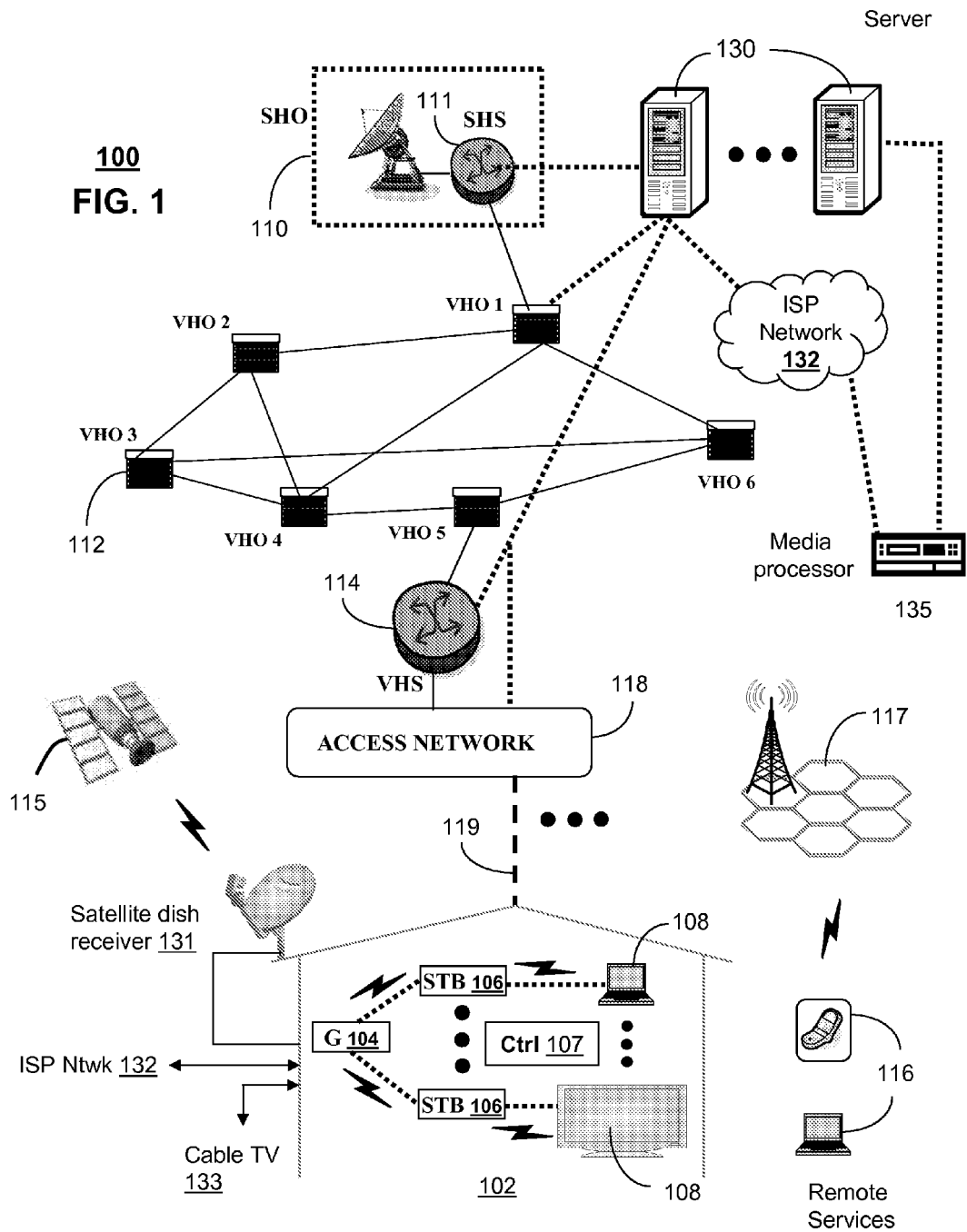
FIGS. 1-2 depict illustrative embodiments of communication systems that provide media services.

FIG. 1 depicts an illustrative embodiment of a first communication system 100 for delivering media content. The communication system 100 can represent an Internet Protocol Television (IPTV) broadcast media system. The IPTV media system can include a super head-end office (SHO) 110 with at least one super headend office server (SHS) 111 which receives media content from satellite and/or terrestrial communication systems. In the present context, media content can represent audio content, moving image content such as videos, still image content, or combinations thereof. The SHS server 111 can forward packets associated with the media content to video head-end servers (VHS) 114 via a network of video head-end offices (VHO) 112 according to a common multicast communication protocol.

The VHS 114 can distribute multimedia broadcast programs via an access network 118 to commercial and/or residential buildings 102 housing a gateway 104 (such as a common residential or commercial gateway). The access network 118 can represent a group of digital subscriber line access multiplexers (DSLAMs) located in a central office or a service area interface that provide broadband services over optical links or copper twisted pairs 119 to buildings 102. The gateway 104 can use common communication technology to distribute broadcast signals to media processors 106 such as Set-Top Boxes (STBs) which in turn present broadcast channels to media devices 108 such as computers or television sets managed in some instances by a media controller 107 (such as an infrared or RF remote control).

The gateway 104, the media processors 106, and media devices 108 can utilize tethered interface technologies (such as coaxial or phone line wiring) or can operate over a common wireless access protocol. With these interfaces, unicast communications can be invoked between the media processors 106 and subsystems of the IPTV media system for services such as video-on-demand (VoD), browsing an electronic programming guide (EPG), or other infrastructure services.

Some of the network elements of the IPTV media system can be coupled to one or more computing devices 130 a portion of which can operate as a web server for providing portal services over an Internet Service Provider (ISP) network 132 to wireline media devices 108 or wireless communication devices 116 by way of a wireless access base station 117 operating according to common wireless access protocols such as Wireless Fidelity (WiFi), or cellular communication technologies (such as GSM, CDMA, UMTS, WiMAX, Software Defined Radio or SDR, and so on).

The first communication system 100 can also include a media processor 135. The media processor 135 can be configured to operate in an iTV network, which can include, but is not limited to including, IPTV, interactive cable television, and interactive satellite television. Additionally, the media processor 135 can be communicatively linked to the ISP network 132, the one or more computing devices 130, and to other devices in the system 100. Furthermore, the media processor 135 can be a STB, a digital video recorder, media player, mobile device, personal computer, telephone, personal digital assistant (PDA), or other similar device.

Operatively, the media processor 135 can be configured to receive an invitation to participate in a media session from one or more devices in the system 100. Such devices can include, but are not limited to including, the computing devices 130, the STBs 106, media devices 108, and wireless communications device 116. The media session can include the presentation of a media program, which can be scheduled at a particular time. The media program can include video content, audio content, still image content, text content, and other types of content. For example, the content can be a television show, song, or other media content. Once, the media processor 135 receives the invitation, the media processor 135 can be configured to either accept, reject, or ignore the invitation.

If the media processor 135 accepts the invitation, the media processor 135 can transmit the acceptance to the device in the system 100 that sent the invitation. Invitations can also be sent to other devices in the system and each accepting device can be added to the media session. Each device participating in the media session can view invitation status information for other devices participating in the media session, the scheduled time for presentation of the media program, a list of participants participating in the media session, and other information. If the scheduled time for the media program is after a live broadcast of the program, each device participating in the media session can download the media program and view the program at the scheduled time.

Another distinct portion of the computing devices 130 can function as a server (herein referred to as server 130). The server 130 can use common computing and communication technology to perform the function of receiving and processing media content, invitations, and other data. Notably, the server 130 can serve as an intermediary between the devices in the system 100. In particular, the server 130 can be configured to transmit an invitation from one device in the system 100 to another device in the system 100. The server 130 can also transmit the responses to the invitations to the device which sent the invitation. Additionally, the server 130 can be configured to connect each device which accepts the invitation to the media session. Once the devices are connected to the media session, the server 130 can also be configured to transmit the media program to each device for presentation.

It will be appreciated by an artisan of ordinary skill in the art that a satellite broadcast television system can be used in place of the IPTV media system. In this embodiment, signals transmitted by a satellite 115 supplying media content can be intercepted by a common satellite dish receiver 131 coupled to the building 102. Modulated signals intercepted by the satellite dish receiver 131 can be submitted to the media processors 106 for generating broadcast channels which can be presented at the media devices 108. The media processors 106 can be equipped with a broadband port to the ISP network 132 to enable infrastructure services such as VoD and EPG described above.

In yet another embodiment, an analog or digital broadcast distribution system such as cable TV system 133 can be used in place of the IPTV media system described above. In this embodiment the cable TV system 133 can provide Internet, telephony, and interactive media services.

It follows from the above illustrations that the present disclosure can apply to any present or future interactive over-the-air or landline media content services.

Figure 2:
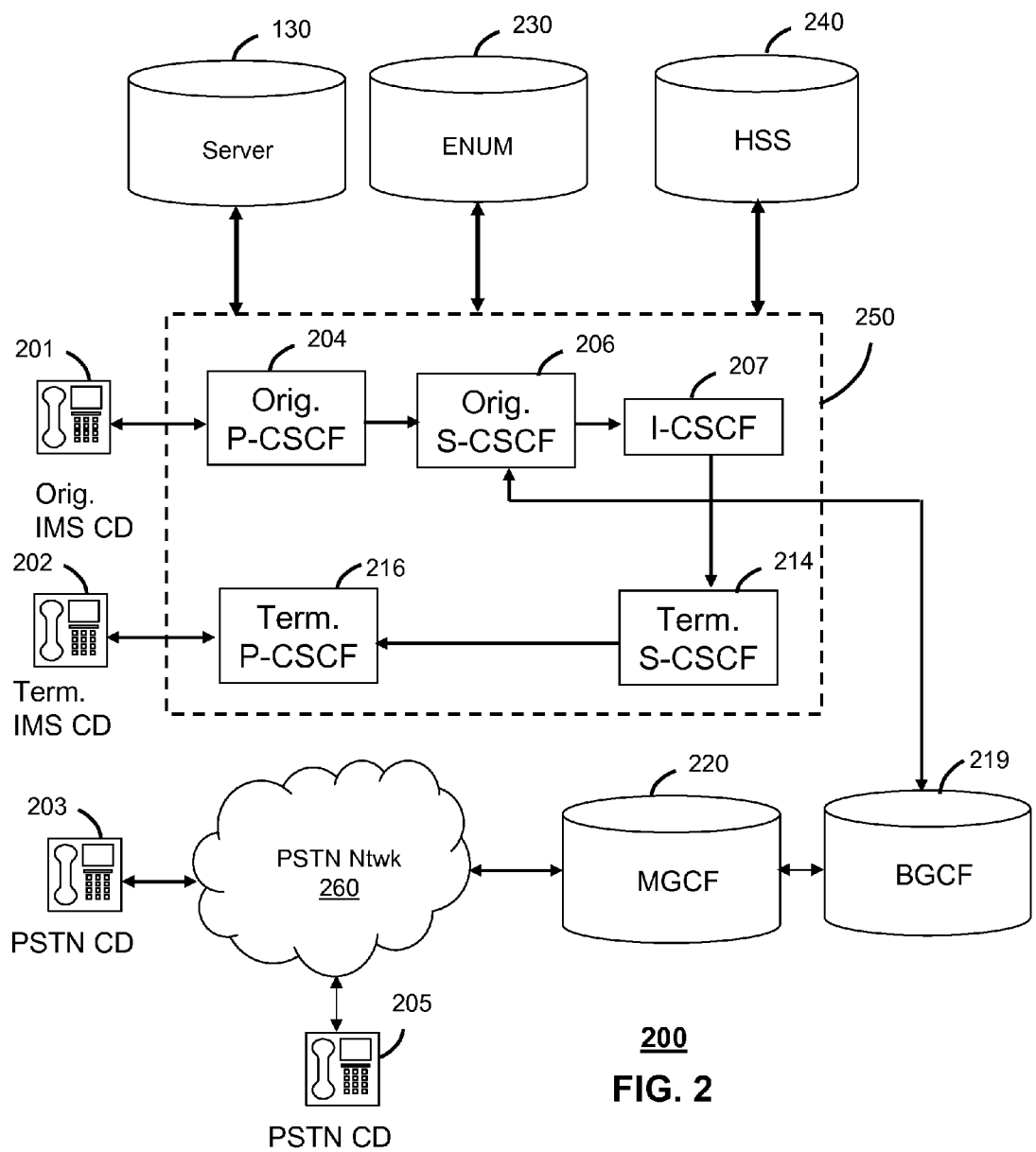

FIG. 2 depicts an illustrative embodiment of a communication system 200. employing an IP Multimedia Subsystem (IMS) network architecture to facilitate the combined services of circuit-switched and packet-switched systems. Communication system 200 can be overlaid or operably coupled with communication system 100 as another representative embodiment of communication system 100.

Communication system 200 can comprise a Home Subscriber Server (HSS) 240, a tElephone NUmber Mapping (ENUM) server 230, and other common network elements of an IMS network 250. The IMS network 250 can establish communications between IMS compliant communication devices (CD) 201, 202, Public Switched Telephone Network (PSTN) CDs 203, 205, and combinations thereof by way of a Media Gateway Control Function (MGCF) 220 coupled to a PSTN network 260.

IMS CDs 201, 202 can register with the IMS network 250 by contacting a Proxy Call Session Control Function (P-CSCF) which communicates with a corresponding Serving CSCF (S-CSCF) to register the CDs with at the HSS 240. To initiate a communication session between CDs, an originating IMS CD 201 can submit a Session Initiation Protocol (SIP INVITE) message to an originating P-CSCF 204 which communicates with a corresponding originating S-CSCF 206. The originating S-CSCF 206 can submit queries to the ENUM system 230 to translate an E.164 telephone number in the SIP INVITE to a SIP Uniform Resource Identifier (URI) if the terminating communication device is IMS compliant.

The SIP URI can be used by an Interrogating CSCF (I-CSCF) 207 to submit a query to the HSS 240 to identify a terminating S-CSCF 214 associated with a terminating IMS CD such as reference 202. Once identified, the I-CSCF 207 can submit the SIP INVITE to the terminating S-CSCF 214. The terminating S-CSCF 214 can then identify a terminating P-CSCF 216 associated with the terminating CD 202. The P-CSCF 216 then signals the CD 202 to establish communications.

If the terminating communication device is instead a PSTN CD such as references 203 or 205, the ENUM system 230 can respond with an unsuccessful address resolution which can cause the originating S-CSCF 206 to forward the call to the MGCF 220 via a Breakout Gateway Control Function (BGCF) 219. The MGCF 220 can then initiate the call to the terminating PSTN CD by common means over the PSTN network 260.

The aforementioned communication process is symmetrical. Accordingly, the terms "originating" and "terminating" in FIG. 2 are interchangeable. It is further noted that communication system 200 can be adapted to support video conferencing by way of common protocols such as H.323. In addition, communication system 200 can be adapted to provide the IMS CDs 201, 203 the multimedia and Internet services of communication system 100.

The server 130 of FIG. 1 can be operably coupled to the second communication system 200 for purposes similar to those described above.

Figure 3:
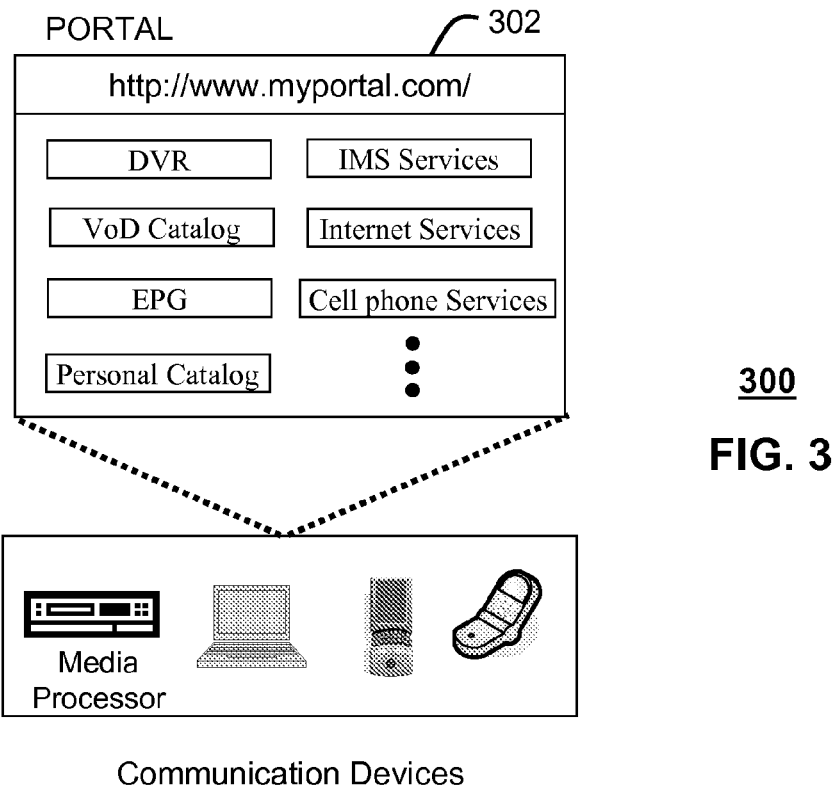
FIG. 3 depicts an illustrative embodiment of a portal interacting with the communication systems of FIGS. 1-2.

FIG. 3 depicts an illustrative embodiment of a portal 302 which can operate from the computing devices 130 described earlier of communication 100 illustrated in FIG. 1. The portal 302 can be used for managing services of communication systems 100-200. The portal 302 can be accessed by a Uniform Resource Locator (URL) with a common Internet browser such as Microsoft's Internet Explorer™ using an Internet-capable communication device such as those described for FIGS. 1-2. The portal 302 can be configured, for example, to access a media processor 106 and services managed thereby such as a Digital Video Recorder (DVR), a VoD catalog, an EPG, a personal catalog (such as personal videos, pictures, audio recordings, etc.) stored in the media processor, provisioning IMS services described earlier, provisioning Internet services, provisioning cellular phone services, and so on.

Figure 4:
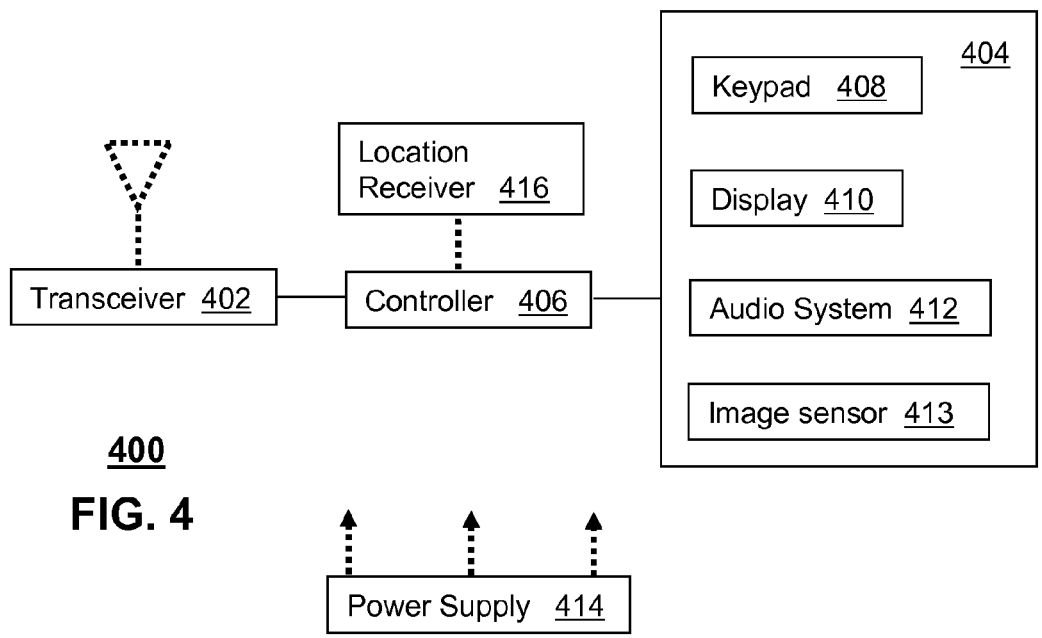
FIG. 4 depicts an illustrative embodiment of a communication device utilized in the communication systems of FIGS. 1-2.

FIG. 4 depicts an exemplary embodiment of a communication device 400. Communication device 400 can serve in whole or in part as an illustrative embodiment of the communication devices of FIGS. 1-2. The communication device 400 can comprise a wireline and/or wireless transceiver 402 (herein transceiver 402), a user interface (UI) 404, a power supply 414, a location receiver 416, and a controller 406 for managing operations thereof. The transceiver 402 can support short-range or long-range wireless access technologies such as Bluetooth, WiFi, Digital Enhanced Cordless Telecommunications (DECT), or cellular communication technologies, just to mention a few. Cellular technologies can include, for example, CDMA-1X, UMTS/HSDPA, GSM/GPRS, TDMA/EDGE, EV/DO, WiMAX, SDR, and next generation cellular wireless communication technologies as they arise. The transceiver 402 can also be adapted to support circuit-switched wireline access technologies (such as PSTN), packet-switched wireline access technologies (such as TCPIP, VoIP, etc.), and combinations thereof.

The UI 404 can include a depressible or touch-sensitive keypad 408 with a navigation mechanism such as a roller ball, joystick, mouse, or navigation disk for manipulating operations of the communication device 400. The keypad 408 can be an integral part of a housing assembly of the communication device 400 or an independent device operably coupled thereto by a tethered wireline interface (such as a USB cable) or a wireless interface supporting for example Bluetooth. The keypad 408 can represent a numeric dialing keypad commonly used by phones, and/or a Qwerty keypad with alphanumeric keys. The UI 404 can further include a display 410 such as monochrome or color LCD (Liquid Crystal Display), OLED (Organic Light Emitting Diode) or other suitable display technology for conveying images to an end user of the communication device 400. In an embodiment where the display 410 is touch-sensitive, a portion or all of the keypad 408 can be presented by way of the display.

The UI 404 can also include an audio system 412 that utilizes common audio technology for conveying low volume audio (such as audio heard only in the proximity of a human ear) and high volume audio (such as speakerphone for hands free operation). The audio system 412 can further include a microphone for receiving audible signals of an end user. The audio system 412 can also be used for voice recognition applications. The UI 404 can further include an image sensor 413 such as a charged coupled device (CCD) camera for capturing still or moving images.

The power supply 414 can utilize common power management technologies such as replaceable and rechargeable batteries, supply regulation technologies, and charging system technologies for supplying energy to the components of the communication device 400 to facilitate long-range or short-range portable applications. The location receiver 416 can utilize common location technology such as a global positioning system (GPS) receiver for identifying a location of the communication device 400 based on signals generated by a constellation of GPS satellites, thereby facilitating common location services such as navigation.

The communication device 400 can use the transceiver 402 to also determine a proximity to a cellular, WiFi or Bluetooth access point by common power sensing techniques such as utilizing a received signal strength indicator (RSSI) and/or a signal time of arrival (TOA) or time of flight (TOF). The controller 406 can utilize computing technologies such as a microprocessor, a digital signal processor (DSP), and/or a video processor with associated storage memory such a Flash, ROM, RAM, SRAM, DRAM or other storage technologies.

The communication device 400 can be adapted to perform the functions of the media processor 106, the media devices 108, or the portable communication devices 116 of FIG. 1, as well as the IMS CDs 201-202 and PSTN CDs 203-205 of FIG. 2. It will be appreciated that the communication device 400 can also represent other common devices that can operate in communication systems 100-200 of FIGS. 1-2 such as a gaming console and a media player.

Figure 5:
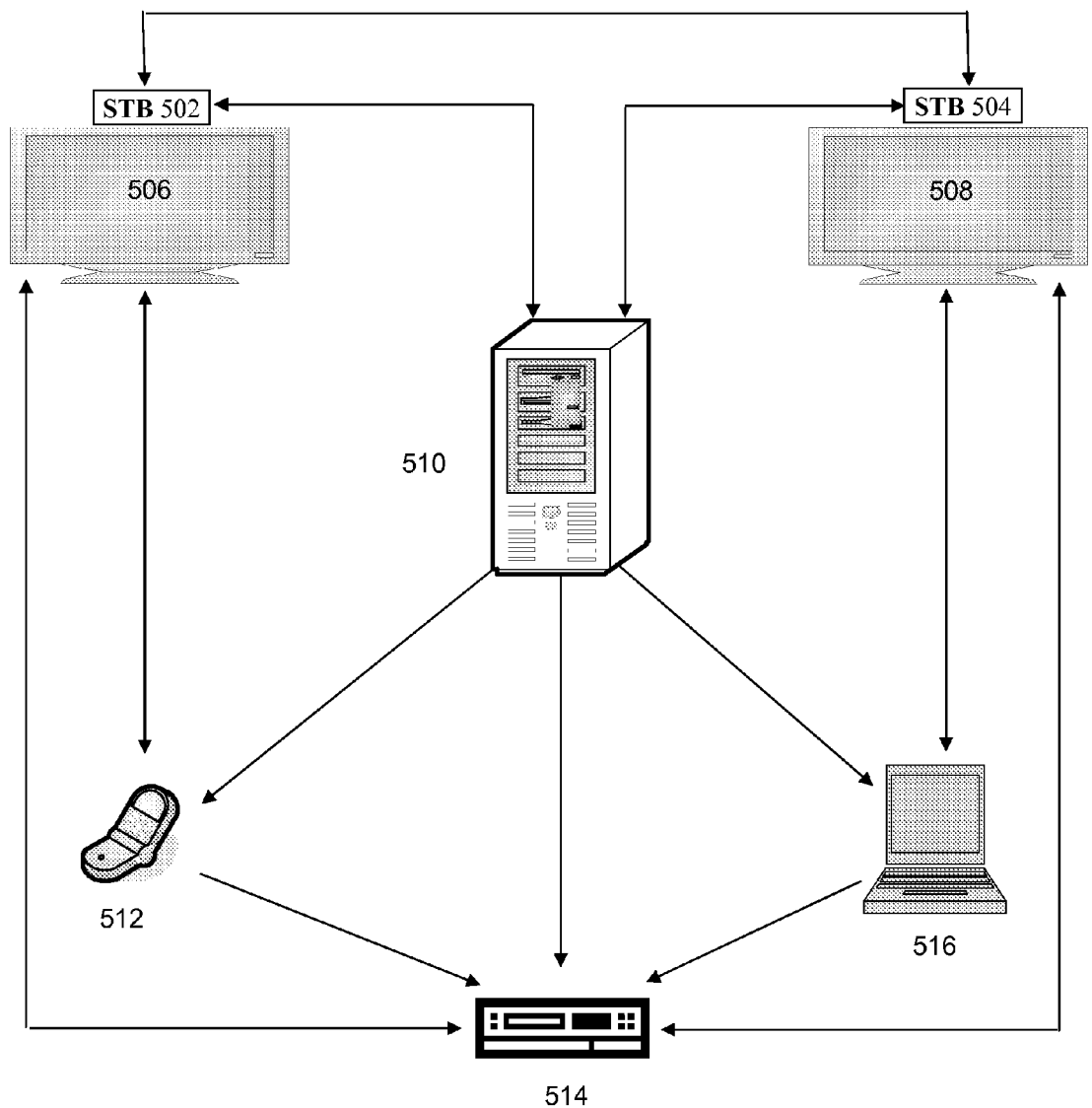
FIG. 5 depicts an illustrative embodiment of a system for providing distributed media consumption, the system operating in the communications systems of FIGS. 1-2.

FIG. 5 depicts an illustrative embodiment of a system 500 for providing distributed media consumption, the system 500 being operable in portions of the communications systems of FIGS. 1-2. The system 500 can include one or more media processors, which can be configured to deliver media content to display devices. Notably, the media processors can include any device capable of displaying and/or playing media content such as STBs 502 and 504, televisions, and other similar devices. The system 500 can also include a server 510 which can serve as an intermediary between the devices in the system 500 and can include the operative features of the server 130 described above. Additionally, the system 500 can include a communications device 512, a DVR 514, and a computing device 516. The communications device 512 can include, for example, a mobile device, a cellular phone, wireless device, or other communications device and the computing device 516 can be a personal computer, laptop, or other similar device. The devices in the system 500 can also be configured to operate in an iTV network, which can include IPTV, cable television, satellite television, and any other types of iTV.

Operatively, a device in the system 500, such as STB 502, can be configured to select a media program and one or more devices in the system 500 to receive an invitation to participate in a media session. The selections can be performed via a GUI, an EPG, or other interface. It is important to note that any of the devices in the system 500 can be configured to perform the operative functions described below. The media session can include presentation of the media program and can further include voice, text, video, and other communications between any devices participating in the media session. The media program can include video content, text content, audio content, still image content, and any other types of content. For example, the media program can be a television show or other scheduled content.

Once the media program and devices for receiving the invitation are selected by STB 502, STB 502 can generate and transmit the invitation to the devices selected by the STB 502. If the generation of the invitation is performed using a GUI or an EPG, the GUI or EPG can include functionality to enable one to add devices/users for receiving the invitation, enter invitation text to describe the invitation, set a scheduled viewing time, and perform other operative functions. The actual invitation itself can include the invitation text, the scheduled time for experiencing the media program, a list of invitees, and other information. The invitation text can include a description of what the invitation entails and can include any message that a user of STB 502 wants to convey to any recipients of the invitation. Notably, the scheduled time for experiencing the media program can be on or after a particular media program airs.

Figure 6:
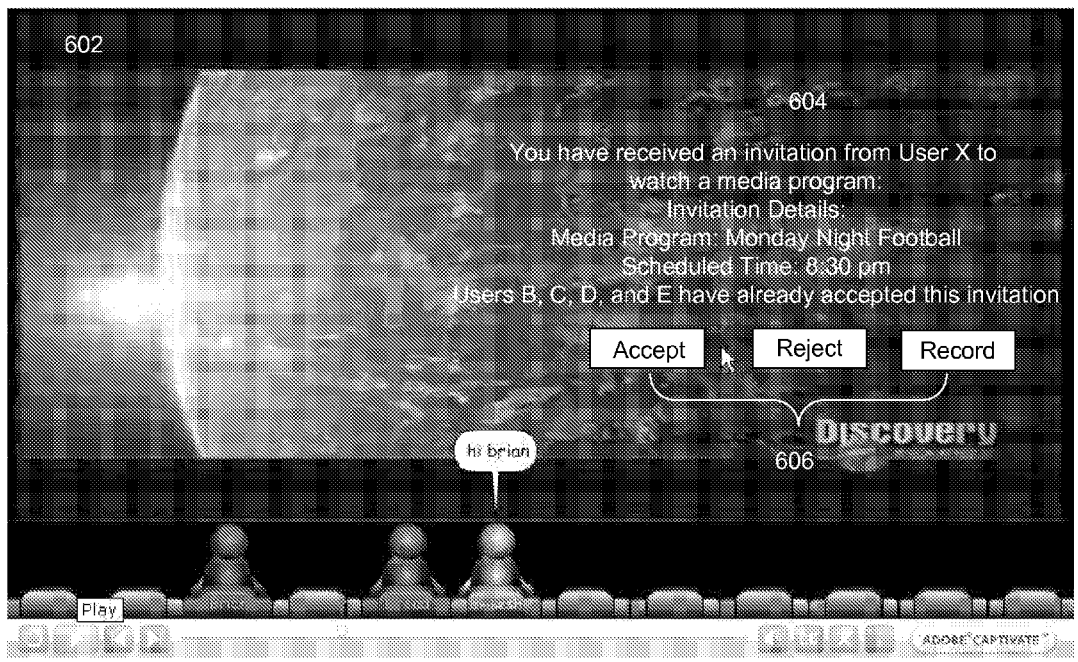
FIG. 6 depicts a screenshot illustrating an incoming invite for participating in a media session.

Referring now also to FIG. 6, a screenshot 600 illustrating an incoming invitation for participating in a media session is depicted. The screenshot 600 features an interface 602, which enables the invitation to be displayed on a user's television set. The invitation 604 can be displayed while a user is watching or experiencing another program. Additionally, the invitation 604 can be displayed when the user turns on their device. For example, in this case, a user is watching a program when the invitation pops up on the screen, which says "You have received an invitation from user X to watch a media program." In this case, the invitation 604 can specify that the media program is "Monday Night Football," the scheduled presentation time is at 8:30 pm, and that users B, C, D, and E have already accepted the invitation to participate in the media session. The user receiving the invitation can be presented with a series of options 606 for responding to the invitation. For example, the options 606 can include, but are not limited to including, a button for accepting, rejecting, and ignoring the invitation. Additionally, an option can be provided for recording the media program as well.

Once a device in the system 500 has received the invitation, the device can visually display the invitation along with any other information associated with the invitation. As mentioned above, the invitation and other information associated with the invitation can include invitation text, an invitation status, a list of media devices participating in the media session, and a scheduled viewing time of the media program. Various options for responding to the invitation can be presented to a user of the device, such as those shown for FIG. 6. As mentioned above, a user can be given the option of accepting, rejecting, or ignoring the invitation. If the user rejects the invitation, a rejection can be transmitted to the STB 502 indicating the user's rejection. If the user accepts the invitation, an acceptance can be transmitted to the STB 502. The invitation status that is visually displayed at the device can indicate whether a particular invitee has accepted, rejected, or ignored the invitation. Additionally, the invitation status can indicate that a response is pending from a particular invitee.

Once the STB 502 receives an acceptance from the device, the STB 502 can add the accepting device to the media session. The server 510 can also be utilized to add the accepting device to the media session, and, in an embodiment, the server 510 can be configured to manage the media session and presentation of the media program. However, any of the devices in the system 500 can be configured to manage the media session. In this case STB 502 initiated the invitations, so STB 502 can manage the media session for all devices invited to participate in the media session. In an embodiment, the STB 502 can be configured to transmit an alert to each device participating in the media session indicating that presentation of the media program is about to begin. As described above, each device can either reject presentation of the media program, accept presentation of the media program, or ignore the alert. If the scheduled time for viewing the media program is at the actual time the media program is broadcasted, a user can be given the option of switching to media program. The user can then enjoy a shared media experience with other users who are participating in the media session by being able to experience the media program simultaneously.

If, however, the scheduled time for viewing the media program is after the media program actually airs, each device participating in the media session can download the media program by using DVR 514 or another similar device. When the scheduled time for viewing the media program arrives, the downloaded media program can be presented via synchronized event among the various devices in the system 500. In an embodiment, the STB 502 can be configured to transmit control signals to each device participating in the media session and can be configured to synchronize and control playback of the media program, control the media session, or perform other operative functions. The media program can be presented at each participating device and the users can enjoy the shared media experience. It is important to note that any device in the system 500 can perform the functions described above.

Figure 7:
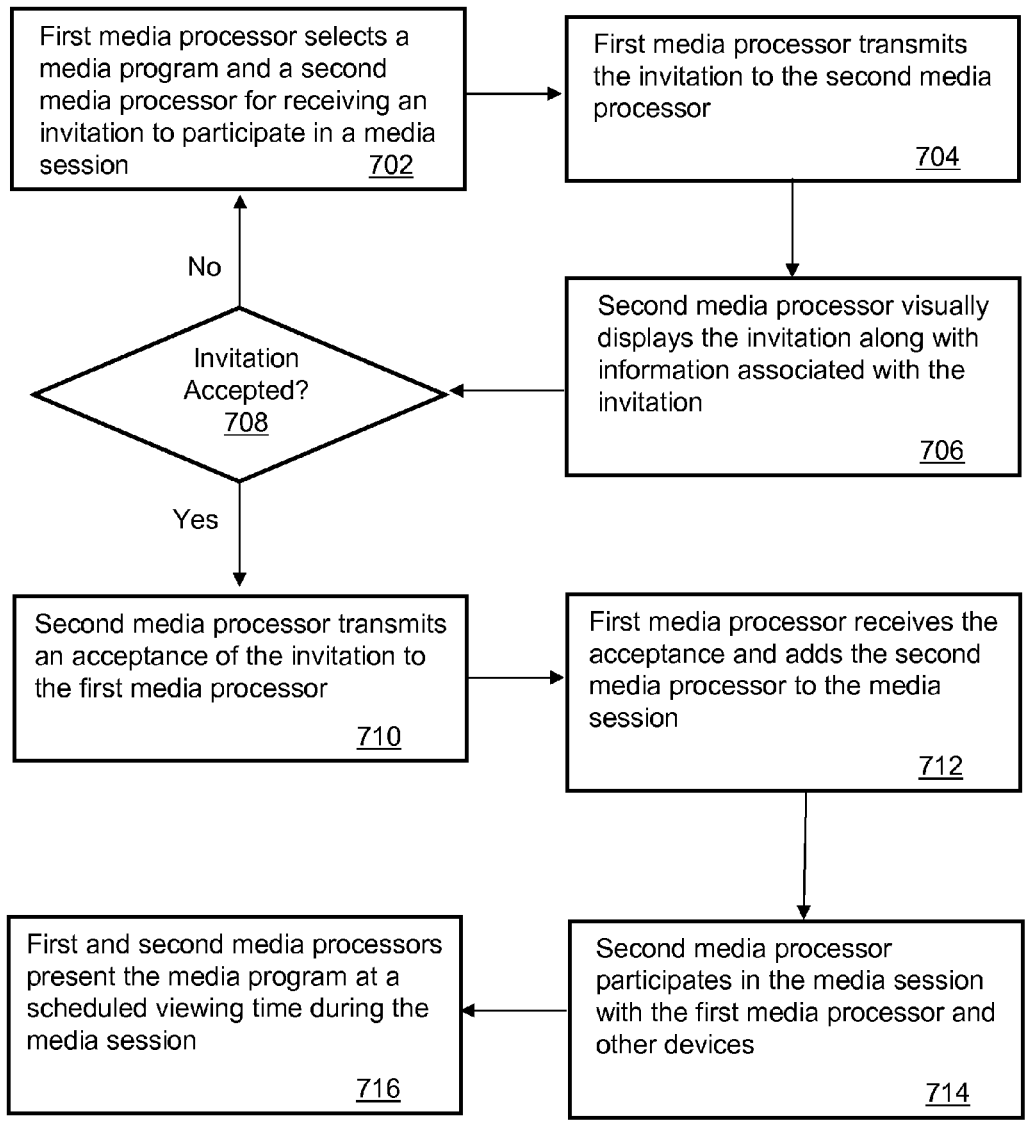
FIG. 7 depicts an illustrative embodiment of a method for providing distributed media consumption, which operates in portions of the communication systems of FIGS. 1-2 and 5.

FIG. 7 depicts an illustrative method 700 that operates in portions of the communication systems of FIGS. 1-2 and 5. Method 700 can begin with step 702 in which a first media processor can select a media program and a second media processor for receiving an invitation to participate in a media session. The media processor can be a STB, personal computer, mobile device, PDA, or other similar device. The media program can include video content, still image content, audio content, text content, and other content. Additionally, the media session can include presentation of the media program. Notably, the first media processor can select other devices to receive the invitation as well, such as those found in FIGS. 1-2 and 5. At step 704, the first media processor can transmit the invitation to the second media processor.

At step 706, the second media processor can visually display the invitation along with information associated with the invitation. The invitation and the information associated with the invitation can include, but is not limited to including, a scheduled time for viewing the media program, a list of users/devices participating in the media session, an invitation status, and invitation text for describing the invitation. It can be determined whether the second media processor accepted the invitation at step 708. If not, the first media processor can conduct the media session without the second media processor. If, however, the media processor accepts the invitation, the second media processor can transmit an acceptance of the invitation to the first media processor at step 710.

At step 712, the first media processor can receive the acceptance of the invitation and then include the second media processor in the media session. At step 714, the second media processor can participate in the media session with the first media processor along with any other devices participating in the media session. The first and second media processors can then proceed to present the media program at a scheduled viewing time during the media session at step 716. Notably, the method 700 can further incorporate the operative functionality of the systems described above and the features described below.

Upon reviewing the aforementioned embodiments, it would be evident to an artisan with ordinary skill in the art that said embodiments can be modified, reduced, or enhanced without departing from the scope and spirit of the claims described below. For example, during the media session, each participating device can be configured to engage in at least one of voice, text, image, and video communications. For example, if the media program is being presented, a user can comment on the media program and the comments can be transmitted to the other devices participating in the media session. In an embodiment, the voice, text, image and video communications can be filtered based on filtration parameters such as those used to filter obscenities.

In another embodiment, a remote control device can be utilized to control the media session and presentation of the media program over multiple devices so that playback remains synchronized and that the users enjoy a similar media experience.

Other suitable modifications can be applied to the present disclosure without departing from the scope of the claims below. Accordingly, the reader is directed to the claims section for a fuller understanding of the breadth and scope of the present disclosure.

Figure 8:
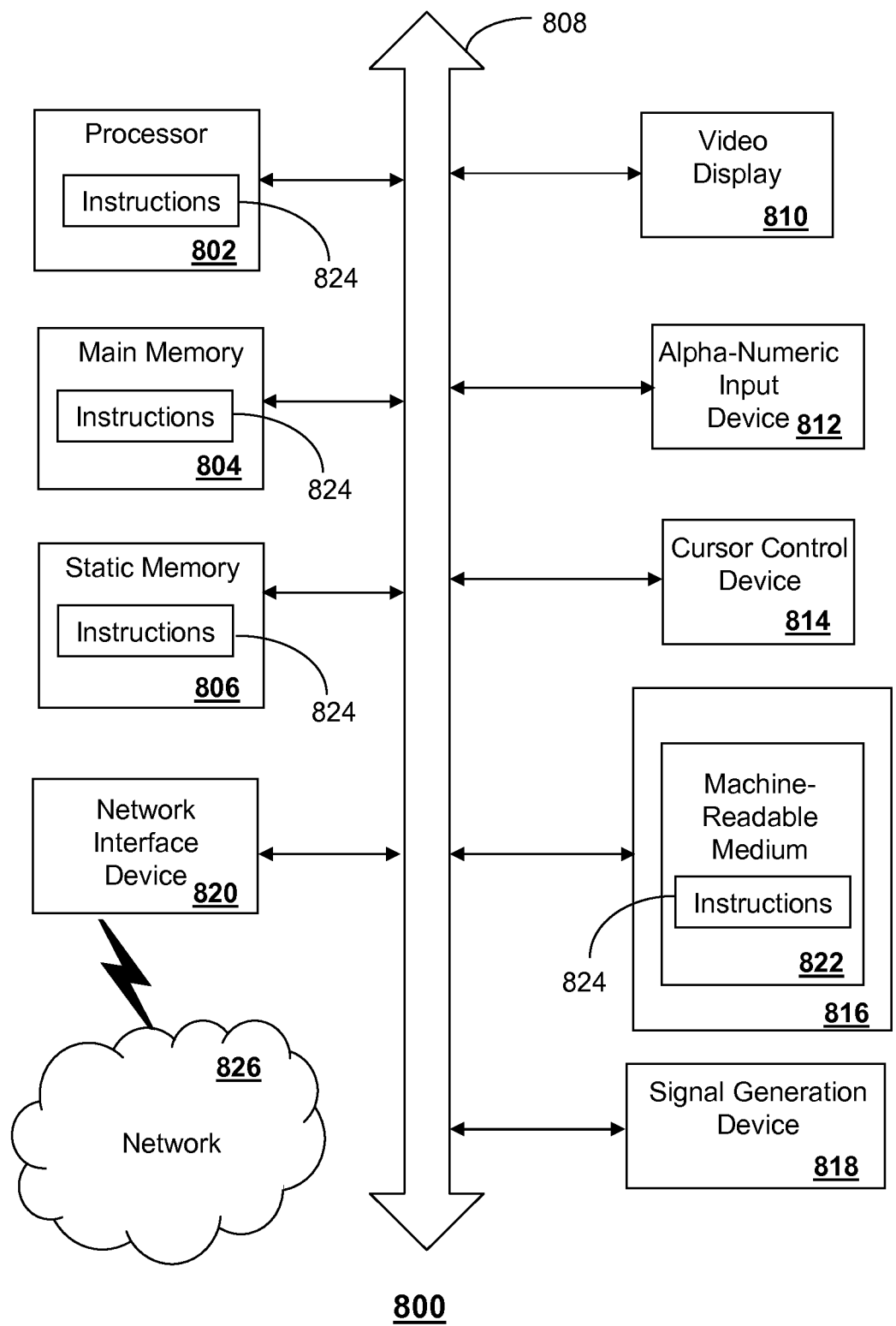
FIG. 8 is a diagrammatic representation of a machine in the form of a computer system within which a set of instructions, when executed, may cause the machine to perform any one or more of the methodologies discussed herein.

FIG. 8 depicts an exemplary diagrammatic representation of a machine in the form of a computer system 800 within which a set of instructions, when executed, may cause the machine to perform any one or more of the methodologies discussed above. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. It will be understood that a device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 800 may include a processor 802 (e.g., a central processing unit (CPU), a graphics processing unit (GPU, or both), a main memory 804 and a static memory 806, which communicate with each other via a bus 808. The computer system 800 may further include a video display unit 810 (e.g., a liquid crystal display (LCD), a flat panel, a solid state display, or a cathode ray tube (CRT)). The computer system 800 may include an input device 812 (e.g., a keyboard), a cursor control device 814 (e.g., a mouse), a disk drive unit 816, a signal generation device 818 (e.g., a speaker or remote control) and a network interface device 820.

The disk drive unit 816 may include a machine-readable medium 822 on which is stored one or more sets of instructions (e.g., software 824) embodying any one or more of the methodologies or functions described herein, including those methods illustrated above. The instructions 824 may also reside, completely or at least partially, within the main memory 804, the static memory 806, and/or within the processor 802 during execution thereof by the computer system 800. The main memory 804 and the processor 802 also may constitute machine-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine readable medium containing instructions 824, or that which receives and executes instructions 824 from a propagated signal so that a device connected to a network environment 826 can send or receive voice, video or data, and to communicate over the network 826 using the instructions 824. The instructions 824 may further be transmitted or received over a network 826 via the network interface device 820.

While the machine-readable medium 822 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure.

The term "machine-readable medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; and/or a digital file attachment to e-mail or other self-contained information archive or set of archives is considered a distribution medium equivalent to a tangible storage medium. Accordingly, the disclosure is considered to include any one or more of a machine-readable medium or a distribution medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method, comprising:

receiving, by a system comprising a processor, an invitation transmitted from a media processor to participate in a media session with other participants, wherein the media session comprises a presentation of a media program selected by the media processor, wherein the media processor operates in an interactive television network, and wherein the media program and a list of media devices participating in the media session are selected by accessing the media processor through an internet portal;

displaying, by the system, the invitation received from the media processor, information associated with the invitation, first selectable items corresponding to options for responding to the invitation, wherein the options comprise accepting the invitation, rejecting the invitation, and ignoring the invitation, and a second selectable item corresponding to an additional option for recording the media program;

transmitting, by the system, to the media processor a response to the invitation via a graphical user interface, wherein the response comprises an acceptance of the invitation, a rejection of the invitation, or an indication that the invitation has been ignored, and wherein an invitation status is displayed at the media processor for each invitation transmitted from the media processor, the invitation status being accepted, rejected, ignored, or pending;

participating, by the system, in the media session if the response comprises the acceptance of the invitation;

subsequently receiving, by the system, an alert transmitted from the media processor if the system is participating in the media session, the alert indicating impending presentation of the media program;

transmitting, by the system, to the media processor, a response to the alert comprising an acceptance of the presentation, a rejection of the presentation, or an indication that the alert has been ignored;

presenting, by the system, the media program at a scheduled viewing time while participating in the media session if the presentation has been accepted and if the scheduled viewing time of the media program is coincident with a live broadcast of the media program;

downloading, by the system, the media program if the presentation has been accepted and if the scheduled viewing time of the media program is after the live broadcast of the media program;

recording, by the system, the media program if the option for recording the media program is selected;

receiving, by the system, control signals from the media processor for managing the media session for all participants in the media session, wherein the control signals for all the participants are transmitted by the media processor that transmitted the invitation, and wherein presentation of the media program is synchronized by the media processor in accordance with a control signal transmitted by the media processor to each device participating in the media session;

presenting, by the system, the downloaded media program responsive to receiving the control signal; and filtering, by the system, communications during the media session with the other participants to remove objectionable content.

2. The method of claim 1, wherein the interactive television network comprises broadcast television, cable television, or satellite television.

3. The method of claim 1, wherein the information associated with the invitation comprises the invitation status, the list of media devices participating in the media session, or a scheduled viewing time of the media program.

4. The method of claim 1, wherein the control signals enable the media processor to control playback of the media program.

5. The method of claim 1, wherein the media processor comprises a set top-box, a personal computer, a mobile device, a telephone, a personal digital assistant, a digital video recorder, a television, or a portable media player.

6. The method of claim 1, wherein the media program comprises video content, audio content, text content, still image content, or recorded content.

7. A first set-top-box of a group of set-top-boxes, the first set-top-box comprising a memory coupled to a controller of the first set-top-box, wherein the memory comprises instructions which, when executed, cause the controller of the first set-top-box to perform operations comprising:

selecting a media program and a second set-top-box of the group of set-top-boxes for receiving an invitation to participate in a media session with other participants, wherein the media session comprises presentation of the media program and wherein the selecting is via an Internet portal access to the first set-top-box;

transmitting the invitation to the second set-top-box of the group of set-top-boxes, wherein first selectable items are visually displayed at the second set-top-box corresponding to options for responding to the invitation, wherein the options comprise accepting the invitation, rejecting the invitation, and ignoring the invitation, wherein a second selectable item is visually displayed at the second set-top-box corresponding to an additional option for recording the media program, and wherein information associated with the invitation is visually displayed at a third set-top-box of the group of set-top-boxes participating in the media session;

displaying an invitation status for each invitation transmitted, the invitation status being accepted, rejected, ignored, or pending; and managing the media session for all participants in the media session, wherein control signals for managing the media session for all the participants are transmitted by the first set-top-box, and wherein managing the media session comprises:

transmitting an alert to the participants in the media session, the alert indicating impending presentation of the media program;

receiving a response to the alert comprising an acceptance of the presentation, a rejection of the presentation, or an indication that the alert has been ignored;

presenting the media program at the first set-top-box during the media session, wherein the media program is presented at the third set-top-box during the media session if the presentation has been accepted, and wherein communications during the media session between set-top-boxes of the group of set-top-boxes are filtered to remove objectionable content; and synchronizing playback of the media program in accordance with a control signal transmitted by the first set-top-box to each set-top-box of the group of set-top-boxes participating in the media session, wherein the media program is recorded at the second set-top-box if the option for recording the media program is selected.

8. The first set-top-box of the group of set-top-boxes of claim 7, wherein a set-top-box of the group of set-top-boxes operates in an interactive television network, wherein the interactive television network comprises broadcast television, cable television, or satellite television.

9. The first set-top-box of the group of set-top-boxes of claim 7, wherein the information associated with the invitation comprises the invitation status, a list of set-top-boxes of the group of set-top-boxes participating in the media session, or a scheduled viewing time of the media program.

10. The first set-top-box of the group of set-top-boxes of claim 7, wherein the invitation, the information associated with the invitation, or the media program are presented at the second set-top-box.

11. The first set-top-box of the group of set-top-boxes of claim 7, wherein the operations further comprise receiving an acceptance of the invitation, a rejection of the invitation, or an indication that the invitation has been ignored from the second set-top-box in response to the invitation, wherein if the controller receives the rejection, the second set-top-box does not participate in the media session, and wherein if the controller receives the acceptance, the second set-top-box participates in the media session.

12. The first set-top-box of the group of set-top-boxes of claim 7, wherein the operations further comprise controlling playback of the media program at each set-top-box of the group of set-top-boxes participating in the media session.

13. The first set-top-box of the group of set-top-boxes of claim 7, wherein the alert prompts each set-top-box of the group of set-top-boxes participating in the media session to perform switching to the media program, recording the media program, or ignoring the alert.

14. A tangible computer-readable storage device, comprising instructions which, when executed by a processor, cause the processor to perform operations comprising:

selecting by accessing a first media processor through an internet protocol a media program and a second media processor of a plurality of media processors for receiving an invitation to participate in a media session with other participants, wherein the media session comprises presentation of the media program;

transmitting the invitation to the second media processor, wherein first selectable items are visually displayed at the second media processor corresponding to options for responding to the invitation, wherein the options comprise accepting the invitation, rejecting the invitation, and ignoring the invitation, wherein a second selectable item is visually displayed at the second media processor corresponding to an additional option for recording the media program, and wherein information associated with the invitation is visually displayed at the second media processor and a third media processor of the plurality of media processors participating in the media session;

receiving a response to the invitation from the second media processor, wherein the response comprises an acceptance or a rejection of the invitation;

displaying an invitation status for each invitation transmitted, the invitation status being accepted, rejected, ignored, or pending; and managing the media session for all participants in the media session, wherein control signals for managing the media session for all the participants are transmitted by the first media processor, and wherein managing the media session comprises:

transmitting an alert to the participants in the media session, the alert indicating impending presentation of the media program;

receiving a response to the alert comprising an acceptance of the presentation, a rejection of the presentation, or an indication that the alert has been ignored;

presenting the media program at the second media processor during the media session if the presentation has been accepted, wherein the media program is presented at the third media processor during the media session, and synchronizing presentation of the media program in accordance with control signals transmitted to each of the plurality of media processors participating in the media session, wherein communications during the media session between media processors of the plurality of media processors participating in the media session are filtered to remove objectionable content, and wherein the media program is recorded at the second media processor if the option for recording the media program is selected.

15. The tangible computer-readable storage device of claim 14, wherein the operations further comprise controlling playback of the media program at each of the plurality of media processors during the media session.

16. The tangible computer-readable storage device of claim 14, wherein the invitation or the information associated with the invitation comprise invitation text, a scheduled viewing time for the media program, the invitation status, or a list of media processors of the plurality of media processors participating in the media session.

17. The tangible computer-readable storage device of claim 14, wherein the operations further comprise receiving voice, text, image, or video communications from the second media processor, and transmitting the received voice, text, image, or video communications to each media processor of the plurality of media processors participating in the media session.

18. The tangible computer-readable storage device of claim 14, wherein the alert prompts the second media processor to perform switching to the media program, recording the media program, or ignoring the alert.

* * * * *